United States Patent
Tilton

(10) Patent No.: US 8,526,733 B2
(45) Date of Patent: Sep. 3, 2013

(54) SYSTEM AND METHOD FOR IMPROVED COMPUTATIONAL PROCESSING EFFICIENCY IN THE HSEG ALGORITHM

(75) Inventor: James C. Tilton, Bowie, MD (US)

(73) Assignee: The United States of America as represented by the Administrator of the National Aeronautics Space Administration, Washington, DC (US)

( * ) Notice: Subject to any disclaimer, the term of this patent is extended or adjusted under 35 U.S.C. 154(b) by 203 days.

(21) Appl. No.: 13/150,316

(22) Filed: Jun. 1, 2011

(65) Prior Publication Data
US 2011/0299777 A1 Dec. 8, 2011

Related U.S. Application Data

(60) Provisional application No. 61/350,999, filed on Jun. 3, 2010.

(51) Int. Cl.
*G06K 9/34* (2006.01)
(52) U.S. Cl.
USPC ........................................... 382/173

(58) Field of Classification Search
USPC ......... 382/173, 175–177, 180–181, 190–191, 382/199, 203–204
See application file for complete search history.

(56) References Cited

U.S. PATENT DOCUMENTS 8,233,712 B2 * 7/2012 Maxwell et al. .............. 382/173

\* cited by examiner

*Primary Examiner* — Jose Couso

(57) ABSTRACT

Disclosed herein are systems, methods, and non-transitory computer-readable storage media for processing image information using a more computationally efficient version of a previously developed HSEG (Hierarchical Segmentation) algorithm. The HSEG algorithm includes iterations intertwining two forms of region growing to produce a set of hierarchically related image segmentations. The first form is a commonly used approach in which regions are grown by merging the most similar spatially adjacent regions. The second form is a unique approach in which regions are grown by also merging spatially non-adjacent regions that are at least as similar as the spatially adjacent regions merged by the first form in the same iteration. The improved HSEG algorithm limits the regions considered for non-adjacent region merging in the second form of operation to regions having at least a minimum number of pixels. This minimum is dynamically controlled to optimize processing efficiency and image segmentation quality.

13 Claims, 7 Drawing Sheets

202

204

206

208

402  404  406

408  410  412

502　　　　　504　　　　　506

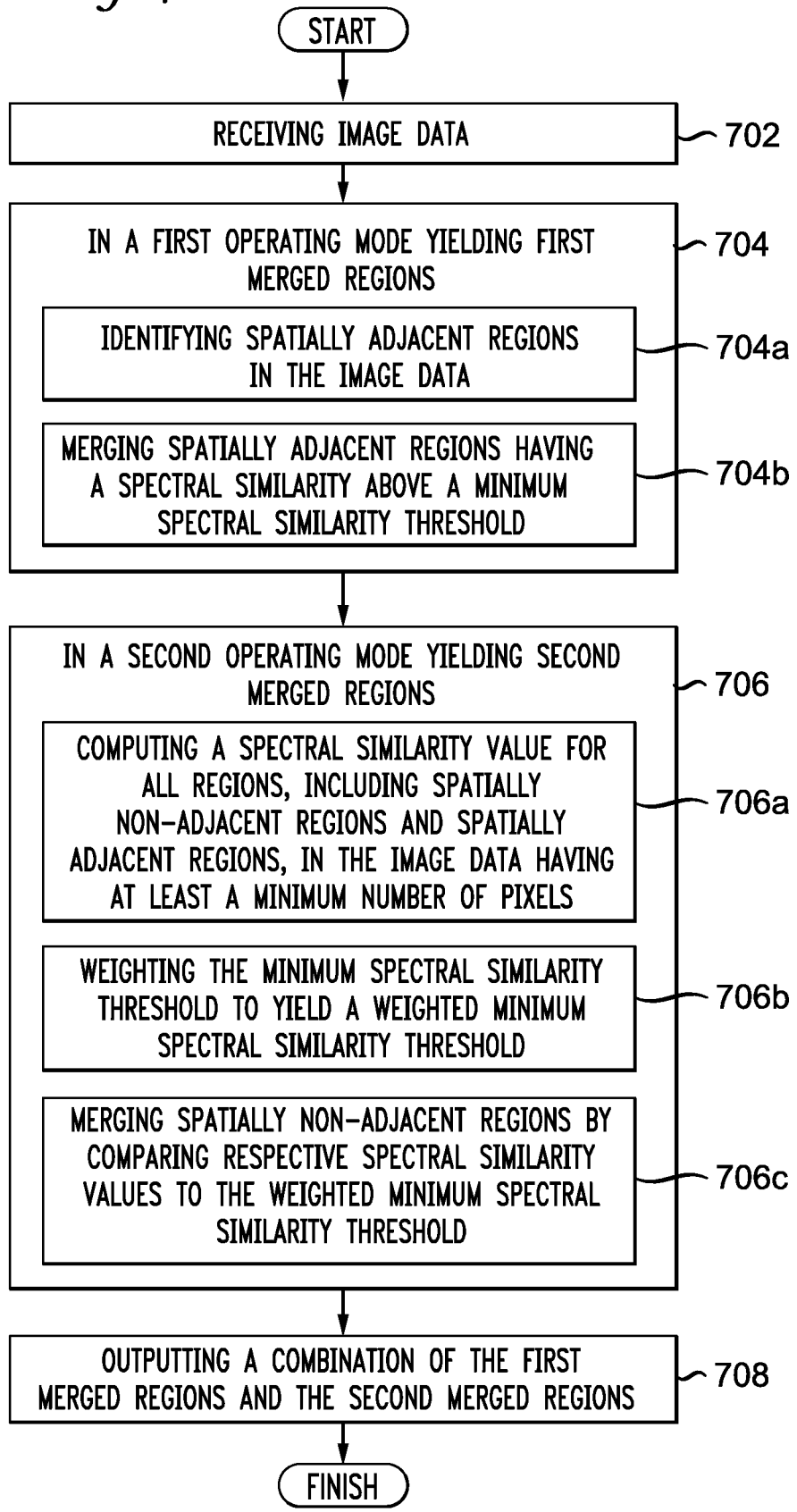

SYSTEM AND METHOD FOR IMPROVED COMPUTATIONAL PROCESSING EFFICIENCY IN THE HSEG ALGORITHM

RELATED APPLICATIONS

This application claims priority to U.S. Provisional Application No. 61/350,999, filed 3 Jun. 2010, the contents of which are herein incorporated by reference in their entirety.

ORIGIN

The disclosure described herein was made by an employee of the United States Government and may be manufactured and used by or for the Government for governmental purposes without the payment of any royalties thereon or therefore.

DEFINITIONS

HSEG stands for Hierarchical Segmentation.
HSWO stands for Hierarchical Step-Wise Optimization.
OBIA stands for Object-Based Image Analysis.
RHSEG stands for Recursive Hierarchical Segmentation.
RHSWO stands for Recursive Hierarchical Step-Wise Optimization.

BACKGROUND

1. Technical Field

The present disclosure relates to image processing and more specifically to a region growing approach for image segmentation.

2. Introduction

Image segmentation is the partitioning of an image into related sections or regions. For remotely sensed images of the earth, such as satellite imagery, an example of image segmentation is a labeled map that divides the image into areas covered by distinct earth surface covers such as water, snow, types of natural vegetation, types of rock formations, types of agricultural crops, and other man-made development or structures. In unsupervised image segmentation, the labeled map can include generic labels such as region 1, region 2, etc., which may be converted to meaningful labels by a post-segmentation analysis.

For the past several decades, Earth scientists have analyzed images of the Earth collected by a wide variety of Earth orbiting satellites. As the optical, satellite and data processing technology evolved, this image data has become available with increasingly high spatial resolution. Recently, similar high spatial resolution image data has also become available to planetary scientists from the Mars and Lunar Reconnaissance Orbiters.

Nearly all of the computerized image analysis performed by Earth and planetary scientists is pixel-based analysis, in which an algorithm is applied directly to individual image pixels. While this analysis approach is satisfactory in many cases, it is usually not fully effective in extracting the information content from the high spatial resolution image data that is now becoming increasingly available. The field of Object-Based Image Analysis (OBIA) has arisen in recent years to address the need to move beyond pixel-based analysis. Hierarchical Segmentation (HSEG) software was developed to facilitate moving from pixel-based image analysis to OBIA. The HSEG algorithm provides an excellent starting point for OBIA because (i) HSEG produces high spatial fidelity image segmentations, (ii) HSEG automatically groups spatially connected region objects into region classes, and (iii) HSEG automatically produces a hierarchical set of image segmentations.

RHSEG is an approach to perform image segmentation that is very efficient for handling embarrassingly parallel problems, but certain data sets, such as image data having many valid small regions, may be extremely processor intensive using RHSEG. Further, a scalable parallel processing architecture may not be feasible or may not be available for processing image data. In this case, only HSEG is a viable option, in which any improvement in the efficiency and/or accuracy of HSEG, or improvements which control the number of 'large regions' considered for non-adjacent region merging in HSEG would be valuable.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The principles disclosed herein provide for improved efficiency when performing image segmentation using an HSEG-based approach while maintaining high image segmentation quality. This approach incorporates a dynamic threshold of the minimum number of pixels used to define what is a "large region" in order to improve computational efficiency by preventing the number of "large regions" considered for non-adjacent region merging from rising to more than a specified target number of regions, and in order to maintain high image segmentation quality by keeping the number of "large regions" very close to this same specified target number of regions without exceeding that target value. Also, in order to maintain high image segmentation quality, in certain special circumstances, this approach allows the number of "large regions" to exceed the target value temporarily to prevent the number of "large regions" from dropping to such a low value that the quality of the image segmentation results would be adversely affected. Another modification of these principles selects subset hierarchical segmentations that are included in the output segmentation hierarchy. The principles disclosed herein have a major impact on processing time for HSEG, and can significantly improve the quality of image segmentation results for certain image data sets, with minimal to no impact on the quality of image segmentation results for other image data sets.

The HSEG algorithm tightly intertwines region growing segmentation, which produces spatially connected region objects, with region object classification, which groups sets of region objects together into region classes. No other practical operational image segmentation approach has this tight integration of region growing object finding with region classification.

The effectiveness of any OBIA approach is highly dependent on the quality of the image segmentation upon which it is based. Thus, the underlying image segmentation should preserve the information content of the image. HSEG is able to preserve this information. FIG. 2 shows a portion of an original Ikonos image 202 of Patterson Park in Baltimore, Md. FIG. 2 also shows a region mean image 206 of the same area after HSEG segmentation, which looks much more similar to the original image 202 than the corresponding region mean image for the HSWO segmentation result 204. HSEG produces a highly compact representation of this particular image into just 43 region classes, grouping each of 7,011 region objects into one of these 43 region classes. The 218 region object representation produced by HSWO is not quite so compact, but, more significantly, does a much poorer job of representing the information content of the image. HSEG tightly integrates region object finding and region classification to enable a compact representation of the image information content while maintaining high spatial fidelity.

This tight integration of region growing object finding and region classification also leads directly to HSEG automatically grouping of spatially connected region objects into region classes and makes possible the automatic production of a compact hierarchical set of image segmentations. These aspects provide additional advantages in utilizing HSEG segmentations for OBIA.

Consider the patterning of dark roofs evident throughout the original image 202. These roofs are labeled as region class "6" in the HSEG segmentation result shown in image 206 and are highlighted in white in image 208. Image 208 shows a certain regularity of the roof pattern to the southeast, east and north of Patterson Park. This area is generally an older residential area, with a few business interspersed. The roof pattern to the southwest and west of Patterson Park appears somewhat different. This area has a denser concentration of businesses and apartment complexes. Pixel-based analysis could never detect this difference in spatial patterning whereas detection of such spatial patterning should be possible with the appropriate OBIA approach. The assumption made here is that if the spatial pattern detection system built into the human eye-brain system can detect it, a sufficiently sophisticated OBIA approach should also be able to detect it. The ability of HSEG to find region objects and group these region objects into region classes makes patterns like these roof patterns accessible to OBIA.

A segmentation hierarchy is a set of several image segmentations of the same image at different levels of detail in which the segmentations at coarser levels of detail can be produced from simple merges of regions at finer levels of detail. This can be useful for applications that require different levels of image segmentation detail depending on the characteristics of the particular image objects segmented. A unique feature of a segmentation hierarchy that distinguishes it from most other multilevel representations is that the segment or region boundaries are maintained at the full image spatial resolution for all levels of the segmentation hierarchy.

In a segmentation hierarchy, an object of interest may be represented by multiple image segments in finer levels of detail in the segmentation hierarchy, and may be merged into a surrounding region at coarser levels of detail in the segmentation hierarchy. If the segmentation hierarchy has sufficient resolution, the object of interest will be represented as a single region segment at some intermediate level of segmentation detail. The segmentation hierarchy may be analyzed to identify the hierarchical level at which the object of interest is represented by a single region segment. The object may then be potentially identified through its spectral and spatial characteristics. Additional clues for object identification may be obtained from the behavior of the image segmentations at the hierarchical segmentation levels above and below the level(s) at which the object of interest is represented by a single region. A basic understanding of image segmentation and segmentation hierarchies can help understand the HSWO, HSEG and RHSEG algorithms.

HSWO is an implementation of the hierarchical step-wise region growing approach to image segmentation. The HSEG algorithm is an augmentation of HSWO which (i) provides for the merging of non-adjacent regions (effectively classifying connected region objects into spatially disjoint region classes), and (ii) provides approaches for selecting region growing iterations from which segmentation results are saved to form a segmentation hierarchy. RHSEG is a recursive approximation of HSEG. RHSEG can optionally utilize parallel computing for increased processing speed. HSEGExtract is an example program for extracting certain segmentation features (e.g., region mean, region standard deviation) from selected levels of the segmentation hierarchies produced by HSWO, HSEG or RHSEG. HSEGReader is an example user interactive program for examining the region class and region object feature values of the regions in the segmentation hierarchies produced by HSWO, HSEG or RHSEG. HSEGViewer is an example user interactive program for visualizing, manipulating and interacting with the segmentation hierarchies produced by HSWO, HSEG or RHSEG.

HSWO, or Hierarchical Step-Wise Optimization, is a form of region growing segmentation that directly forms a segmentation hierarchy. HSWO is an iterative process, in which the iterations include finding the best segmentation with one region less than the current segmentation. The HSWO approach can be summarized into three steps. First, the HWSO approach includes initializing the segmentation by assigning each image pixel a region label. If a pre-segmentation is provided, this step includes labeling each image pixel according to the pre-segmentation. Otherwise, each image pixel is labeled as a separate region. Second, the HWSO approach includes calculating the dissimilarity criterion value between all pairs of spatially adjacent regions, find the pair of spatially adjacent regions with the smallest dissimilarity criterion value, and merge that pair of regions. Third, the HWSO approach includes stopping if no more merges are required and otherwise the flow returns to the second step. HSWO naturally produces a segmentation hierarchy including the entire sequence of segmentations from initialization down to the final trivial one region segmentation, if allowed to proceed that far. For practical applications, however, a subset of segmentations needs to be selected out from this exhaustive segmentation hierarchy.

HSEG, or Hierarchical Segmentation, interjects between HSWO iterations merges of spatially non-adjacent regions (i.e., spectrally based merging or clustering) constrained by a threshold derived from the previous HSWO iteration. The relative importance of region growing and spectral clustering merges is controlled by the parameter spclust_wght, which can vary from 0.0 to 1.0. When spclust_wght=0.0, only merges between spatially adjacent regions are allowed (no spectral clustering). With spclust_wght=1.0, merges between spatially adjacent and spatially non-adjacent regions are given equal priority. For 0.0<spclust_wght<1.0, spatially adjacent merges are given priority over spatially non-adjacent merges by a factor of 1.0/spclust_wght. Thus for spclust_wght>0.0, spatially connected region objects may be grouped or classified into spatially disjoint region classes.

HSEG also adds to HSWO approaches for selecting a subset of segmentations for an output segmentation hierarchy. By default, the subset is selected that minimizes the number of hierarchical levels utilized to guarantee that each large region (a region containing at least min_npixels pixels) is involved in no more than one merge with a spatially adjacent large region from one hierarchical level to the next. A user can explicitly a set of iterations based on the number of regions or merge thresholds at those iterations. Further, because segmentation results with a large number of regions are usually not interesting, the hierarchical segmentation results may be output at each iteration or can be withheld from output until the number of regions reaches a user specified value, chk_nregions, the first entry in the hseg_out_nregions list, or the merging threshold reaches the value of the first entry of the hseg_out_thresholds list.

While the addition of constrained spectral clustering significantly reduces the number of regions required to characterize an image, especially for larger highly varied images, it also significantly increases the computational requirements for performing HSEG. This increase in computational requirements is counteracted by RHSEG, a computationally efficient recursive approximation of HSEG.

This disclosure provided herein is another method for reducing the computational requirements for hierarchical segmentation. This method includes a program parameter spclust_max, which can be set to a default of 1024 or any other suitable value, and a program variable min_npixels through which the number of regions involved constrained spectral clustering is limited to no more than spclust_max regions by allowing only those regions containing at least min_npixels pixels to participate in the constrained spectral clustering. Such regions are termed "large regions." The system can adjust the value of min_npixels periodically to the smallest value that restricts the number of large regions to no more than spclust_max.

Another modification to this method that can further reduce the computational requirements for HSEG introduces a spclust_min program parameter, which can be set to a default of 512 or other suitable value. spclust_min can be used to prevent the number of "large regions" involved in spectral clustering from falling to too small of a value. Test results show that at times image segmentation quality was degraded when the number of "large regions" involved in spectral clustering dropped to a small value. So the value of min_npixels can be initially adjusted to the smallest value that restricts the number of "large regions" to no more than spclust_max. However, if this value of min_npixels results in the number of "large regions" being less than spclust_min, the value of min_npixels is reduced by one (unless it is already equal to one) and the number of "large regions" with this new value of min_npixels is checked. If this new value of min_npixels results in the number of "large regions" being more than 6*spclust_max (or spclust_max times any other suitable coefficient), the value of min_npixels is incremented back up by one, unless this would result in the number of "large regions" becoming less than two. In the later case, the value of min_npixels as is left as is even though this results in the number of large regions exceeding 6*spclust_max. The value of min_npixels can be incremented and decremented by values other than one, depending on the desired results.

RHSEG is a recursive, divide-and-conquer, approximation of HSEG which can be described for $N^D$ spatial dimension image data. As shown in FIG. 6, RHSEG can be summarized into a general logical flow 700 of three main steps (602), (604), (618). First, given an input image X, RHSEG specifies the number of levels of recursion (rnb_levels) required and pads the input image, if necessary, so that for each spatial dimension the image can be evenly divided by 2(rnb_levels–1) (602). A good value of rnb_levels results in an image section at level=rnb_levels that includes about 1,048,576=1024*1024 pixels. RHSEG then sets level=1. Second, RHSEG calls rhseg(level, X) (604). The call to rhseg (level, X) includes several sub-steps. Sub-step (606) is if level=rnb_levels, go to sub-step (612); otherwise, divide the image data into $2^{N_D}$ equal subsections and call rhseg(level+1, $X/2^{N_D}$) for each image section (represented as $X/2^{N_D}$) (608). Sub-step (610) is after $X/2^{N_D}$ calls to rhseg( ) from sub-step (608), complete processing, reassemble the image segmentation results. Sub-step (612) is if level<rnb_levels, initialize the segmentation (614) with the reassembled segmentation results from sub-step (610); otherwise, initialize the segmentation with one pixel per region (616). Execute the HSEG algorithm on the image X with the following modification: for level>1, terminate the algorithm when the number of regions reaches the preset value min_nregions. Note that rnb_levels and min_nregions are user specified parameters (with default values available). Third, RHSEG executes the HSEG algorithm on the image X (618) using the segmentation output as a pre-segmentation by the call to rhseg( ) in the second step.

Under a number of circumstances, the segmentations produced by the RHSEG algorithm exhibit processing window artifacts. These artifacts are region boundaries that are along the processing window seams, even though the image pixels across the seams are very similar. Processing window artifacts are usually minor, but can be more or less noticeable depending on the image. Such artifacts tend to be more noticeable and prevalent in larger images. However, the processing window artifacts can be completely eliminated by adding a new sub-step to the definition of rhseg(level, X). This new sub-step is if level=rnb_levels, exit. Otherwise do the following and then exit: for each region, identify other regions that may contain pixels that are more similar to it than the region that they are currently in. These regions are placed in a candidate_region_label set for each region by scanning the processing window seam between sections processed at the next deeper level of recursion for pixels that are more similar by a factor of seam_threshold_factor to the region existing across the processing window seam, and identifying regions that have a dissimilarity between each other less than or equal to region threshold_factor*max_threshold.

This new sub-step then can include, for each region with a non-empty candidate_region_label set, identifying pixels in the region that are more similar by a factor of split_pixels_factor to regions in the candidate_region_label set than to the region they are currently in. If spclust_wght=1.0, simply switch the region assignment of these pixels to the more similar region. Otherwise, this sub-step splits these regions out of their current regions and remerges them through a restricted version of HSEG in which region growing is performed with these split-out pixels and merging is restricted to neighboring regions and regions in the candidate_region_label set from which the pixel came.

For level>1, the system can perform this new sub-step once HSEG reached a number of regions equal to min_nregions. For level=1, the system can perform this sub-step once HSEG reaches a number of regions equal to the greater of min_nregions, chk_nregions (if specified), or the first entry in the hseg_out_nregions list (if specified). However, if this value is greater than (3*init_nregions)/4, where init_nregion is the number of regions at the start of sub-step (612), the new sub-step is instead performed once HSEG reaches a number of regions equal to (3*init_nregions)/4. To be most effective, a sufficient number of HSEG iterations should be performed prior to the execution of this new sub-step.

Processing window artifact elimination as introduced herein not only eliminates the processing window artifacts, but does so with minimal computational overhead. The computational overhead is no more than double for a wide range of image sizes. Example program defaults for these parameters are seam_threshold_factor=1.5, split_pixels_factor=1.5. These defaults work well for a wide range of images.

The default value for region_threshold_factor is 0.0, as this aspect of the processing window artifact elimination procedure is usually unnecessary.

The processing window artifact elimination step can be performed after HSEG converges at hierarchical levels 1 through rnb_levels−1. At recursive level 1, HSEG is again run normally after the processing window artifact elimination step is performed until it reaches final convergence when the number of regions reaches the value of the program parameter, conv_nregions. Yet another modification of RHSEG is another new sub-step wherein those regions not involved in spectral clustering (the "small" regions), are also not involved in the pixel split out stage of processing window artifact elimination.

HSEGExtract is an exemplary computer program for extracting certain segmentation features from selected levels of the segmentation hierarchies produced by HSEG or RHSEG. With HSEGExtract, an analyst can select a particular hierarchical segmentation level and then output region class or region objects features from the selected hierarchical level in the form of ENVI format images. The following region class or region objects features may be output: Region labels, region number of pixels, region mean, region standard deviation and region boundary pixel to number of pixels ratio.

HSEGReader is an exemplary graphical user interface (GUI) program that enables an analyst to examine the feature values of the region classes and region objects contained in the hierarchical segmentation results produced by HSEG or RHSEG. With HSEGReader, an analyst can select a particular hierarchical segmentation level and then view the feature values of the region classes in the segmentation at that particular hierarchical level. The analyst can order the region classes by size, standard deviation or boundary pixel ratio feature values. Then for each region class the analyst can view the feature values of the region objects contained in that particular region class. These region objects can also be ordered by size, standard deviation or boundary pixel ratio feature value.

HSEGViewer is an exemplary graphical user interface (GUI) program that enables an analyst to visualize, manipulate, and interact with, the hierarchical segmentation results produced by HSEG or RHSEG. With HSEGViewer, an analyst can view pseudo-color (random color table) versions of the region class and region object segmentations at each hierarchical level saved by HSEG or RHSEG, as well as view a region mean image and hierarchical region boundary map image for each of these segmentations. An analyst can also select a particular region class or object from a particular hierarchical level and label it with a selected color and ASCII text string. With this region selection and labeling facility, an analyst can selectively create a tailored image labeling. HSEGViewer also displays certain region statistics for the selected region class or object over all hierarchical levels, including region number of pixels, region mean vector values, region boundary pixel ratio, and region standard deviation.

Disclosed herein are systems, methods, and non-transitory computer-readable storage media for processing image information using an improved HSEG (Hierarchical Segmentation) algorithm that is roughly equivalent to the computational efficiency of the RHSEG (Recursive Hierarchical Segmentation) approximation of previous versions of HSEG. HSEG can be used to create image segmentations that identify regions in an image that represent objects for object-based image analysis. The HSEG algorithm includes intertwined iterations of two modes of operation. In the first mode of operation, the HSEG algorithm compares the spectral values of spatially adjacent regions by computing a selected dissimilarity function, determines a threshold value as the value of the dissimilarity function for the most similar pairs of spatially adjacent regions, and merges pairs of regions with dissimilarity equal to this threshold. In the second mode of operation, the HSEG algorithm compares the spectral values of all regions, including spatially non-adjacent regions, by computing the selected dissimilarity function, and, using a threshold equal to the threshold used in the first mode of operation, weighted by a factor greater than 0 and less than or equal to 1, merges pairs of spatially non-adjacent regions that have dissimilarity less than or equal to this weighted threshold factor. The improved HSEG algorithm limits the regions considered for non-adjacent region merging in the second mode of operation to regions including a least a minimum number of pixels. This minimum number of pixels is dynamically determined by the program such that the number of regions considered for non-adjacent region merging is limited to a targeted range of number of regions. Provisions are included in the algorithm to allow this number of regions to be more than or less than the targeted range in certain circumstances as necessary for the practical execution of the algorithm. In its dynamic control of the minimum number of pixels of regions considered for non-adjacent region merging, the improved HSEG algorithm trades off computational speed versus image segmentation accuracy, whereas a higher value of this minimum produces improved computational speed and a lower value of this minimum produces improved image segmentation accuracy.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 7 illustrates an example method embodiment.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for improving the efficiency of performing image segmentation.

Figure 1:
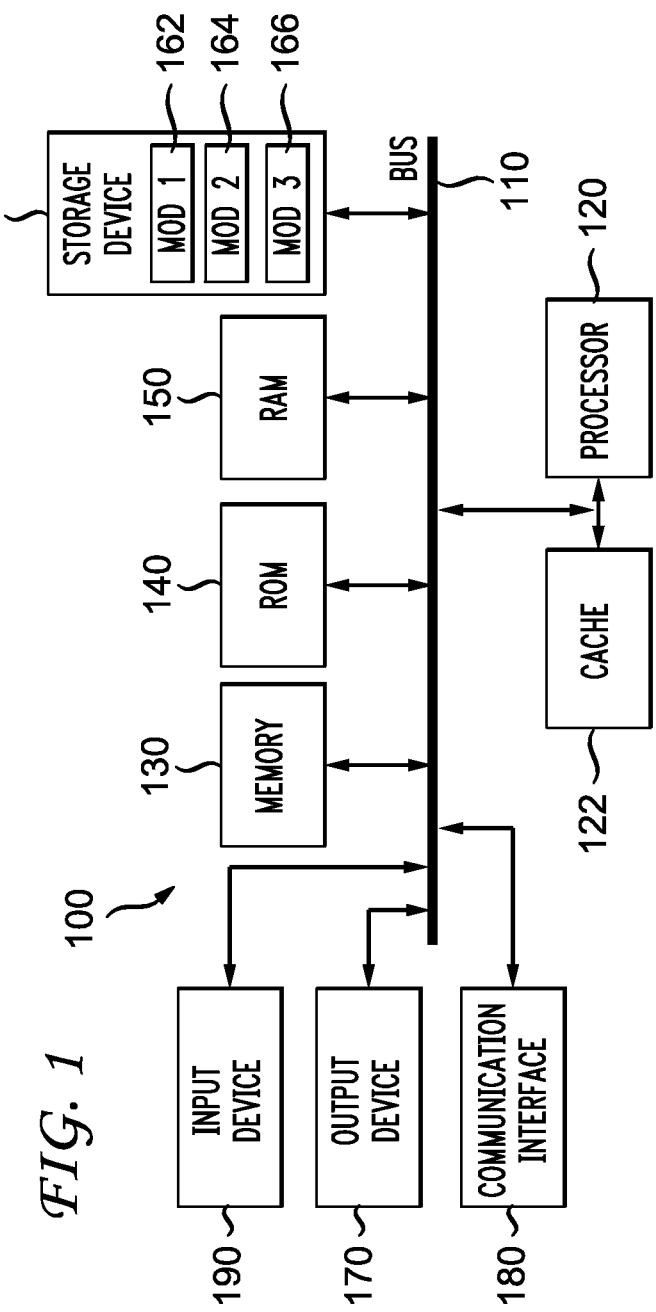
FIG. 1 illustrates an example system embodiment.
Figure 2:
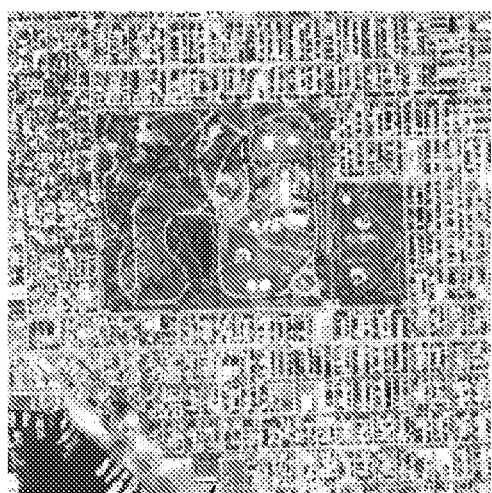
FIG. 2 illustrates example images comparing HSEG segmentation versus region growing segmentation without integrated region classification.
Figure 2:
Figure 2:
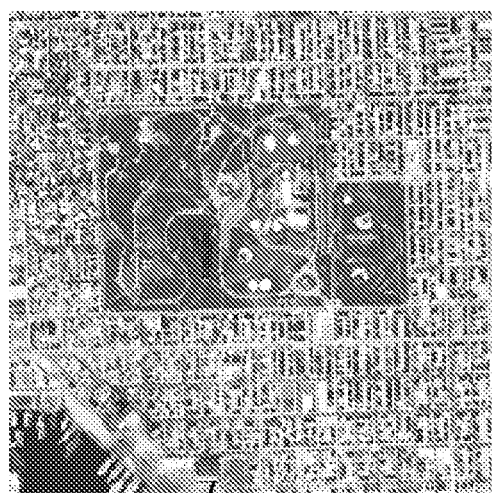
Figure 2:
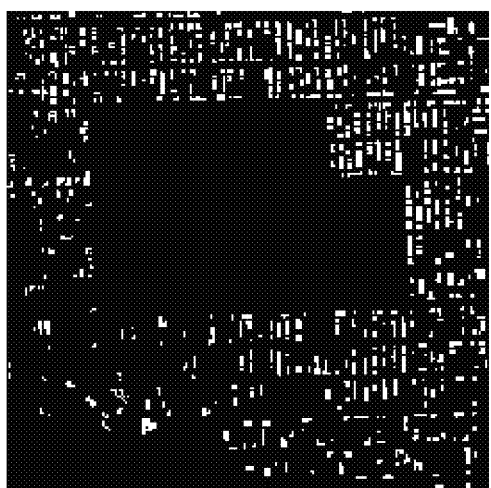

A brief introductory description of a basic general purpose system or computing device in FIG. 1 which can be employed to practice the concepts is disclosed herein. A more detailed description of the improved image segmenting approaches will then follow. The disclosure now turns to FIG. 1.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Having disclosed some components of a computing system, the disclosure now returns to a discussion of the improved HSEG algorithm, applications thereof, and experimental data demonstrating the capabilities of the improved HSEG algorithm. In previous incarnations of the algorithm, the number of regions involved in non-adjacent region merging in HSEG is not limited in any way. This loads to heavy computational demands. One modification disclosed herein to reduce this computational load is to limit nonadjacent region merging to no more than spclust_max regions by allowing only those regions containing at least min_npixels pixels to participate in the non-adjacent region merging. Such regions are termed "large regions." The value of min_npixels can be adjusted periodically to the smallest value that restricts the number of "large regions" to no more than spclust_max. One example default value for spclust_max is 1024.

Another modification of this approach prevents the number of "large regions" from dropping to such a low value that the quality of the image segmentation results is adversely affected. This further modification of HSEG controls the number of regions involved in non-adjacent region merging by initially adjusting the value of min_npixels to the smallest value such that the number of "large regions" (designated as nb_large_regions) is no more than spclust_max. However, if this value of min_npixels results in nb_large_regions<spclust_min (defaulted to 512), the value of min_npixels is reduced by one (unless it is already equal to one) and the value of nb_large_regions with this new value of min_npixels is determined. If this new value of min_npixels results in nb_large_regions>6*spclust_max, the value of min_npixels is incremented back up by one. Finally, if this later adjustment results in nb_large_regions<2, the value of min_npixels is again reduced by one, regardless of whether or not this results in nb_large_regions>6*spclust_max.

This logic for setting the value of min_npixels maintains the nb_large_regions as close as possible to and less than spclust_max. However, this logic allows nb_large_regions to rise above spclust_max (but not too far above spclust_max) as necessary to keep nb_large_regions>spclust_min. Finally, nb_large_regions is allowed to fall below spclust_min if keeping nb_large_regions above spclust_min would result in nb_large_regions being too large, that is, being more than 6*spclust_max. However, nb_large_regions is never allowed to fall below 2.

Further, the value of min_npixels may be checked for adjustment every iteration or at a more sparse interval. Whenever the value of min_npixels is changed, "current" values of spclust_max and spclust_min are determined (call them current spclust_max and current spclust_min for this discussion), and the value of min_npixels is checked only when the number of "large regions" becomes less than current spclust_min (and the value of min_npixels is more than one) or becomes larger than current spclust_max.

The value of current spclust_min is determined whenever min_npixels is checked for adjustment, such as by a system performing the following steps. First the system determines a maximum value for current_spclust_min (max spclust_min) as max spclust_min=spclust_max−0.05*(spclust_max−spclust_min). Then the system initializes current_spclust_min=nb_large_regions. If nb_large_regions≦spclust_max, then the system computes temp_int=spclust_max−2*(spclust_max−nb_large_regions). If temp_int>spclust_min, then the system sets current_spclust_min equal to temp_int. If current_spclust_min>nregions (the current number of regions, both "large" and "small"), the system sets current_spclust_min equal to nregions. If current_spclust_min>max_spclust_min, the system sets current_spclust_min equal to max_spclust_min.

The system determines the value of current_spclust_max whenever min_npixels is checked for adjustment by the following steps. The system initializes current_spclust_max=spclust_max. However, if nb_large_regions>spclust_max, the system sets current_spclust_max equal to nb_large_regions. This logic for determining when to check the value of min_npixels for adjustment prevents wasting computation when the value of min_npixels is unlikely to be changed by the result of that computation.

As with previous versions, RHSEG bases the convergence of HSEG at each hierarchical level on the total number of regions remaining, both large and small. HSEG is considered to have converged for a particular recursive level when the number of regions reaches min_nregions=sub_ncols*sub_nrows*sub_nslices/$2^{N_D}$, where $N_D$ is the number of spatial dimensions, sub_ncols=ncols/$2^{rnb\_levels-1}$, sub_nrows=max(1, nrows/$2^{rnb\_levels-1}$, and sub_nslices=max(1, nslices/$2^{rnb\_levels-1}$). Here ncols, nrows and nslices are the number of columns, rows and slices, respectively, in the image and rnb_levels is the number of recursive levels (for 2-dimensional images, nslices=1). However, at recursive level 1, the convergence point for HSEG modified from previous versions of RHSEG to be the point at which it reaches the number of regions equal to converge_nregions, where converge_nregions is the greater of min_nregions, chk_nregions (if specified), or the first entry in the hseg_out_nregions list (if specified), and the processing window artifact elimination step is performed at that point before HSEG is resumed until final convergence at conv_nregions regions. However, to ensure that a sufficient number of HSEG iterations are performed prior to running the artifact elimination step, if converge_nregions>(3*init_nregions)/4, converge_nregions is set to (3*init_nregions)/4, where init_nregions is the number of regions (large and small) at point where the segmentation is reassembled from the results from the previous recursive level.

The chk_nregions parameter specifies the number of region classes (or region objects in the case of HSWO) at which the segmentation hierarchy output is initiated. After this point, the iterations at which the segmentation is output are determined such that the minimal subset of hierarchical levels in which no large region (i.e., a region with number of pixels greater or equal to the current value of min_npixels) is involved in more than one spatially adjacent merge. The spclust_min parameter specifies the nominal minimum number of regions for which non-adjacent region merging (spectral clustering) is performed in HSEG or RHSEG. The spclust_max parameter specifies the nominal maximum number of regions for which non-adjacent region merging (spectral clustering) is performed in HSEG or RHSEG. The hseg_out_nregions parameter specifies the set of number of regions at which hierarchical segmentation output are made. The conv_nregions parameter specifies the number of regions for final convergence, or the iteration at which HSEG or RHSEG is terminated. This differs from the method of selecting the subset of hierarchical levels. That method selects the minimal subset of hierarchical levels in which no region of any size was involved in more than one merge of any type.

The disclosure now turns to a discussion of the capabilities of these improved image segmenting approaches and algorithms. The impact of these algorithms on processing time is demonstrated in the timing results presented in Tables III-2, III-3, III-4 and III-5. The data set processed and computer systems used to test these capabilities are outlined below.

Timing tests for this disclosure were performed on portions of a six band Landsat Thematic Mapper data set using the default "Square Root of Band Sum Mean Squared Error" dissimilarity criterion for HSEG and RHSEG. The computer used for all tests, except for the parallel processing tests, has an AMD® Phenom™ II 920 2.8 GHz 64-bit Quad-Core processor with 8 GB RAM. The parallel tests were performed on the Discover system at the NASA Center for Computational Sciences (NCCS). Eight nodes of the Discover system were utilized in these tests with each node containing 2 quad-core 2.8 GHz Intel® Xeon™ Nehalem processors, for a total of 64 CPUs. While the processors for the two systems are different, the identical clock speeds make the two systems fairly comparable.

Figure 3:
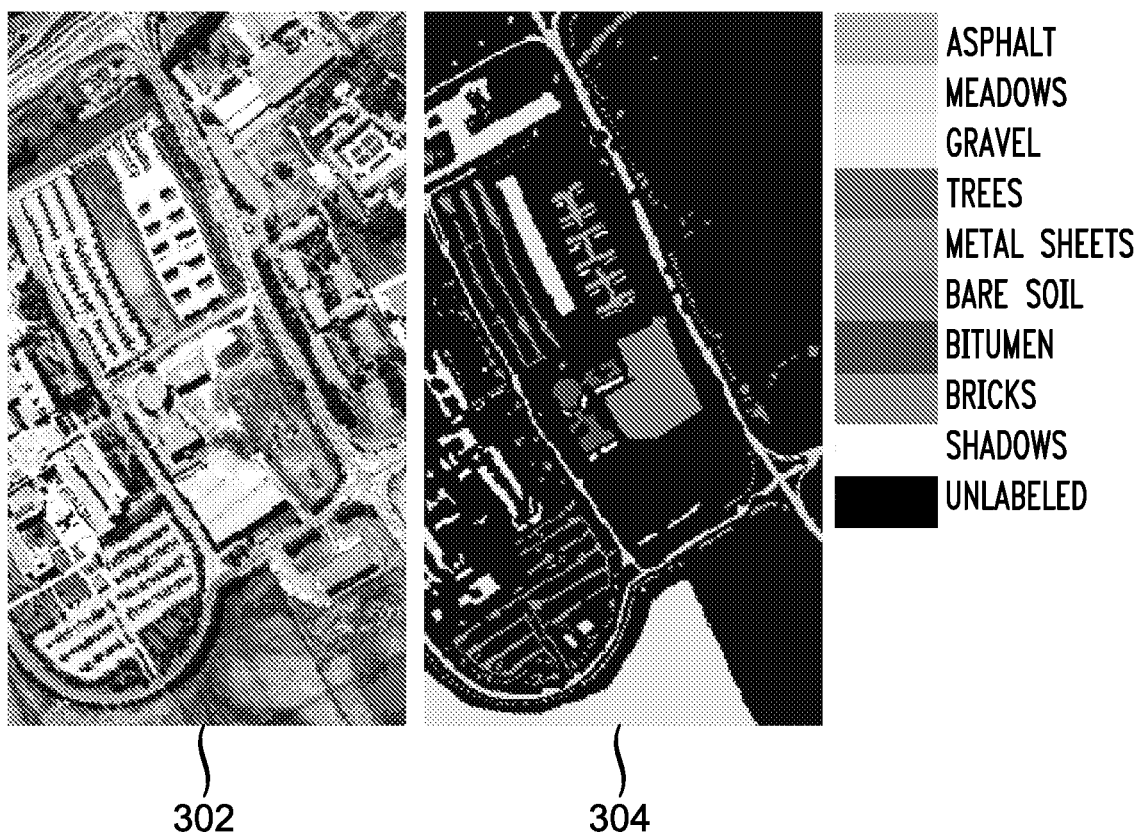
FIG. 3 illustrates an example segmented three-band false color image.

The qualitative and quantitative analysis of image segmentation quality is performed here with a hyperspectral image recorded by the Reflective Optics System Imaging Spectrometer (ROSIS) over the University of Pavia, Italy. The image is 610×340 pixels, with a spatial resolution of 13 meters. The ROSIS sensor has 115 spectral channels, with a spectral range of 0.43 to 0.86 µm. The 12 noisiest channels were removed, and the remaining 103 spectral bands were used in this experiment. The reference data contains nine ground cover classes: asphalt, meadows, gravel, trees, metal sheets, bare soil, bitumen, bricks, and shadows. FIG. 3 illustrates a three-band false color image of this data set 302, reference training data 304, and the exemplary color key. The training data for the SVM classifier and segmentation optimization are randomly selected pixels from the reference data.

Table III-1 shows the number of pixels in the SVM training, segmentation training and test sets for the University of Pavia data set.

"Square Root of Band Sum Mean Squared Error" dissimilarity criterion was utilized. For very small images (such as 64×64 pixels), the run times for version 1.47 are very similar to the run times for version 1.51. However, as the image sizes get larger, the run times of version 1.47 of HSEG diverge more and more from the run times for version 1.51 until at an image size of 512×512 pixels, version 1.51 of HSEG is from 48 to over 340 times faster than version 1.47. The divergence becomes even more pronounced for larger images (explicit tests were not run because version 1.47 would take too long to run).

TABLE III-2

| | HSEG Version 1.47 | | | HSEG Version 1.51 | | |
| | | | spclust_wght | | | |
| Image Size | 0.2 | 0.5 | 1.0 | 0.2 | 0.5 | 1.0 |
| --- | --- | --- | --- | --- | --- | --- |
| 0064 × 0064 | <0:01 | 0:02 | 0:09 | 0:02 | 0:01 | 0:01 |
| 0128 × 0128 | 0:06 | 0:39 | 3:05 | 0:08 | 0:08 | 0:10 |
| 0256 × 0256 | 3:38 | 19:20 | 71:24 | 0:18 | 0:21 | 0:46 |
| 0512 × 0512 | 46:48 | 363:29 | >1000:00 (est.) | 0:58 | 1:06 | 2:58 |
| 1024 × 1024 | * | * | * | 5:41 | 4:03 | 9:30 |
| 2048 × 2048 | * | * | * | 79:07 | 35:51 | 33:10 |

* Test not attempted because it would take too long to complete.

Table III-3 compares the wall clock run times for HSEG and RHSEG version 1.51, along with HSWO. The run times are provided in Min:Sec ($L_r$=rnb_levels). These timing results show that with the disclosed algorithm improvements, the wall clock run times for HSEG are similar to the run times for RHSEG for image sizes up through 1024×1024 pixels.

TABLE III-1

| | Asphalt | Meadows | Gravel | Trees | Metal Sheets | Bare Soil | Bitumen | Bricks | Shadows | Total |
| --- | --- | --- | --- | --- | --- | --- | --- | --- | --- | --- |
| SVM Training | 137 | 215 | 108 | 103 | 101 | 92 | 107 | 113 | 101 | 1077 |
| Segmentation Training | 250 | 424 | 202 | 200 | 201 | 205 | 206 | 237 | 202 | 2127 |
| Testing | 6465 | 18047 | 1897 | 3133 | 1076 | 4807 | 1043 | 3528 | 723 | 40719 |
| Ground Reference | 6852 | 18686 | 2207 | 3436 | 1378 | 5104 | 1356 | 3878 | 1026 | 43923 |

Table III-2 compares the wall clock run times for version 1.51 of HSEG, which implements the improvements disclosed herein, and version 1.47 of HSEG which is the last previous version of HSEG that does not include any of the herein disclosed improvements. In all cases, the default However, for image size 2048×2048, HSEG as well as HSWO become computer RAM-limited, causing HSEG to take more time than RHSEG. HSEG and HSWO cannot even be run on the test computer for image size 4096×4096 due to computer RAM memory limitations.

TABLE III-3

| Image Size | HSWO 0.0 | HSEG 0.2 | 0.5 | 1.0 | RHSEG† Spclust_wght 0.2 | 0.5 | 1.0 |
|---|---|---|---|---|---|---|---|
| 512 × 512 | 0:16 | 0:58 | 1:06 | 2:58 | 1:18 ($L_r = 2$) | 1:37 ($L_r = 2$) | 3:15 ($L_r = 2$) |
| 1024 × 1024 | 1:29 | 5:41 | 4:03 | 9:30 | 3:36 ($L_r = 2$) | 4:24 ($L_r = 2$) | 8:40 ($L_r = 2$) |
|  |  |  |  |  | 5:12 ($L_r = 3$) | 6:40 ($L_r = 3$) | 15:06 ($L_r = 3$) |
| 2048 × 2048 | 13:20 | 79:07 | 35:51 | 33:10 | 13:42 ($L_r = 2$) | 16:12 ($L_r = 2$) | 25:56 ($L_r = 2$) |
|  |  |  |  |  | 17:03 ($L_r = 3$) | 22:27 ($L_r = 3$) | 44:55 ($L_r = 3$) |
|  |  |  |  |  | 23:34 ($L_r = 4$) | 32:49 ($L_r = 4$) | 63:43 ($L_r = 4$) |
| 4096 × 4096 | * | * | * | * | 81:52 ($L_r = 3$) | 65:28 ($L_r = 3$) | 98:11 ($L_r = 3$) |
|  |  |  |  |  | 84:27 ($L_r = 4$) | 100:35 ($L_r = 4$) | 167:55 ($L_r = 4$) |
|  |  |  |  |  | 132:21 ($L_r = 5$) | 165:36 ($L_r = 5$) | 259:46 ($L_r = 5$) |

* Test could not be run due to computer RAM memory limitations.
†The default value for $L_r$ is 2 for image size 2048 × 2048 and 3 for image size 4096 × 4096. RHSEG is not recommended for use for images of size 1024 × 1024 or smaller.

Table III-4 compares the wall clock run times for versions 1.47 and 1.51 of RHSEG. These timing results show that the wall clock run times for these two versions of RHSEG similar at the default values for rnb_levels (the number of levels of recursive subdivision of the input data utilized by RHSEG). The smallest run clock times for RHSEG version 1.47 are generally obtained for a value of rnb_levels that produces a 16×16 pixel processing window at the deepest level of recursion, i.e., 6, 7, and 8 for image sizes 512×512, 1024×1024, 6912×6528, respectively. This value of rnb_levels is taken as the default value for version 1.51 of RHSEG. For smaller images, the smallest possible value of rnb_levels (=2) produces the shortest processing times. The optimal 1024×1024 processing window size is consistent with the results for HSEG version 1.51 shown in Table III-3, where a processing window larger than 1024×1024 caused slowing due to computer RAM limitations.

TABLE III-4

| Image Size | RHSEG Version 1.47 spclust_wght 0.2 | 0.5 | 1.0 | RHSEG Version 1.51 spclust_wght 0.2 | 0.5 | 1.0 |
|---|---|---|---|---|---|---|
| 512 × 512 | 0:30 ($L_r = 5$) | 1:13 ($L_r = 5$) | 3:01 ($L_r = 5$) | 1:18 ($L_r = 2$) | 1:37 ($L_r = 2$) | 3:15 ($L_r = 2$) |
| 1024 × 1024 | 6:10 ($L_r = 5$) | 19:40 | 58:12 | 3:36 ($L_r = 2$) | 4:24 ($L_r = 2$) | 8:40 ($L_r = 2$) |
|  | 2:12 ($L_r = 6$) | ($L_r = 5$) 5:01 | ($L_r = 5$) | 5:12 ($L_r = 3$) | 6:40 ($L_r = 3$) | 15:06 ($L_r = 3$) |
|  | 1:30 ($L_r = 7$) | ($L_r = 6$) 2:08 | 11:58 | 7:49 ($L_r = 4$) | 9:55 ($L_r = 4$) | 15:32 ($L_r = 4$) |
|  |  | ($L_r = 7$) | ($L_r = 6$) 3:27 |  |  |  |
|  |  |  | ($L_r = 7$) |  |  |  |
| 2048 × 2048 | 26:29 | 79:17 | 233:26 | 13:42 | 16:12 ($L_r = 2$) | 25:56 ($L_r = 2$) |
|  | ($L_r = 6$) | ($L_r = 6$) | ($L_r = 6$) | ($L_r = 2$) | 22:27 ($L_r = 3$) | 44:55 ($L_r = 3$) |
|  | 10:40 | 21:58 | 50:10 | 17:03 | 32:49 ($L_r = 4$) | 63:43 ($L_r = 4$) |
|  | ($L_r = 7$) 9:01 | ($L_r = 7$) | ($L_r = 7$) | ($L_r = 3$) |  |  |
|  | ($L_r = 8$) | 11:24 | 14:39 | 23:34 |  |  |
|  |  | ($L_r = 8$) | ($L_r = 8$) | ($L_r = 4$) |  |  |
| 4096 × 4096 | * | * | * | — | 121:12 ($L_r = 2$) | — |
|  |  |  |  | — | 65:28 ($L_r = 3$) | — |
|  |  |  |  | 81:52 | 100:35 ($L_r = 4$) | 98:11 ($L_r = 3$) |
|  |  |  |  | ($L_r = 3$) | 165:36 ($L_r = 5$) | 167:55 ($L_r = 4$) |
|  |  |  |  | 84:27 |  |  |
|  |  |  |  | ($L_r = 4$) |  | 259:46 ($L_r = 5$) |
|  |  |  |  | 132:21 |  |  |
|  |  |  |  | ($L_r = 5$) |  |  |
| 6912 × 6528 | * | * | * | — | 407:28 ($L_r = 3$) | — |
|  |  |  |  | — | 183:33 ($L_r = 4$) | — |
|  |  |  |  | 238:59 | 278:14 ($L_r = 5$) | 251:21 ($L_r = 4$) |
|  |  |  |  | ($L_r = 4$) |  |  |
|  |  |  |  | 261:34 |  | 287:32 ($L_r = 5$) |
|  |  |  |  | ($L_r = 5$) |  |  |

* Test could not be run due to computer RAM memory limitations.

and 2048×2048, respectively. However, better quality image segmentations are obtained with 32×32 pixel processing windows at the deepest level of recursion, i.e., 5, 6, and 7 for image sizes 512×512, 1024×1024, and 2048×2048, respectively. These latter values are taken as the default values of rnb_levels for RHSEG version 1.47. The smallest run clock times for RHSEG version 1.51 are generally obtained for a value of rnb_levels that produces a 1024×1024 pixel (or smaller) processing window at the deepest level of recursion, i.e. 2, 3, and 4 for image sizes 2048×2048, 4096×4096, and Table III-5 compares the wall clock run times for version 1.51 of RHSEG run on a parallel cluster versus version 1.51 of HSEG run on a single processor. The results reported in Table III-5 show that RHSEG is still a useful approximation of HSEG because RHSEG has an "embarrassingly" parallel implementation, which provides substantial run time improvements in parallel processing systems. Using 64 CPUs, RHSEG provides a 9 to 31 times speed up versus HSEG on the 4096×4096 pixel section of the Landsat™ image.

TABLE III-5

| | RHSEG Version 1.51 16 CPUs for 2048 × 2048, 64 CPUs for 4096 × 4096 256 CPUs for 6912 × 6528 spclust_wght | | | RHSEG Version 1.51 1 CPU | | |
|---|---|---|---|---|---|---|
| Image Size | 0.2 | 0.5 | 1.0 | 0.2 | 0.5 | 1.0 |
| 2048 × 2048 | 2:08 ($L_r = 4$) 1:54 ($L_r = 5$) | 4:29 ($L_r = 4$) 3:21 ($L_r = 5$) | 13:52 ($L_r = 4$) 7:20 ($L_r = 5$) | 13:42 ($L_r = 2$) 17:03 ($L_r = 3$) 23:34 ($L_r = 4$) | 16:12 ($L_r = 2$) 22:27 ($L_r = 3$) 32:49 ($L_r = 4$) | 25:56 ($L_r = 2$) 44:55 ($L_r = 3$) 63:43 ($L_r = 4$) |
| 4096 × 4096 | 3:35 ($L_r = 5$) 2:36 ($L_r = 6$) | 8:09 ($L_r = 5$) 4:52 ($L_r = 6$) | 25:41 ($L_r = 5$) 11:01 ($L_r = 6$) | 81:52 ($L_r = 3$) 84:27 ($L_r = 4$) 132:21 ($L_r = 5$) | 65:28 ($L_r = 3$) 100:35 ($L_r = 4$) 165:36 ($L_r = 5$) | 98:11 ($L_r = 3$) 167:55 ($L_r = 4$) 259:46 ($L_r = 5$) |
| 6912 × 6528 | 4:40 ($L_r = 6$) 3:14 ($L_r = 7$) | 9:21 ($L_r = 6$) 4:59 ($L_r = 7$) | 28:13 ($L_r = 6$) 10:26 ($L_r = 7$) | 238:59 ($L_r = 4$) 261:34 ($L_r = 5$) | 183:33 ($L_r = 4$) 278:14 ($L_r = 5$) | 251:21 ($L_r = 4$) 287:32 ($L_r = 5$) |

The pixel-wise classifier used in this study is the SVM classifier. This classifier was chosen because it has been shown to perform extremely well in classifying high-dimensional data with a limited number of training samples. The particular SVM classifier utilized was the multi-class pairwise (one versus one) SVM classifier, with the Gaussian Radial Basis Function (RBF) kernel, by means of the LIBSVM library. Utilizing the SVM training set, the optimal SVM parameters C=32 and γ=0.5 were chosen by 5-fold cross validation.

The plurality vote classifications for all segmentation approaches were evaluated in terms of Overall Accuracy (OA), Average Accuracy (AA) and the kappa coefficient (κ). OA is the percentage of correctly classified pixels, AA is the mean of the class-specific accuracies, and κ is the percentage of agreement (correctly classified pixels) corrected by the number of agreements that would be expected purely by chance.

The segmentation training set was used to construct the optimal segmentations from the segmentation hierarchy produced by both versions of HSEG. Instead of just selecting the segmentation map from one "optimal" hierarchical level, the following procedure was used to construct a class optimized segmentation map over which the plurality vote (PV) classification was performed. The first step of this procedure is to find the hierarchical level that produces the highest overall classification accuracy, and designate this level as $L_B$. If there is more than one such hierarchical level, the procedure chooses the hierarchical level with highest class average accuracy amongst the levels with highest overall classification. If there is more than one such hierarchical level, the procedure chooses the mid-level hierarchical level from these levels. Second, for each ground cover class i=1, . . . , C (C=number of ground cover classes), the procedure finds the hierarchical level that produces the highest class average accuracy, and designates these levels as $L_{Bi}$. If there is more than one such hierarchical level for a particular class, and the range includes $L_B$, then the procedure chooses $L_B$. Otherwise the procedure chooses the mid-level hierarchical level from these levels. Third, the procedure creates a mask with value 1 for each valid image pixel. Fourth, for hierarchical level L, the procedure starts from the lowest or finest hierarchical level and progresses to the highest or coarsest level. At any hierarchical level corresponding to a $L_{Bi}$, the procedure either labels the pixel according to the PV classification for each class, i, with L=$L_{Bi}$, and L≦$L_B$, for pixels with mask value "1" or PV classification of class i (also, for each pixel with PV classification of class i, set the value of mask to "0"), or labels the pixel according to the PV classification and sets the value of mask to "0" for each class, i, with L=$L_{Bi}$, and L>$L_B$, for pixels with mask value "1" and PV classification of class i. This classification strategy ensures that every pixel is classified, while also preventing classifications performed at hierarchical levels L>$L_B$ from inappropriately overwriting classifications performed at hierarchical levels L≦$L_B$. Four nearest neighbor connectivity was used for all segmentation approaches because it generally produced the best PV classification accuracy results.

One unique aspect of the disclosed HSEG algorithm is its tight intertwining of region growing segmentation, which produces spatially connected region objects, with region object classification, which groups sets of region objects together into region classes. The tight integration of region growing object finding and region classification enables the high spatial fidelity of the image segmentations produced by HSEG. However, this tight integration of region growing object finding and region classification is what caused the original version of HSEG to be prohibitively computationally intensive.

RHSEG is a recursive, divide-and-conquer, approximation of HSEG that was devised to overcome the computational difficulties of the original HSEG algorithm. The refined or modified HSEG algorithms rival the computational efficiency of the original or latest RHSEG algorithm. However, the RHSEG algorithm is still useful because of its efficient parallel implementation.

Figure 4:
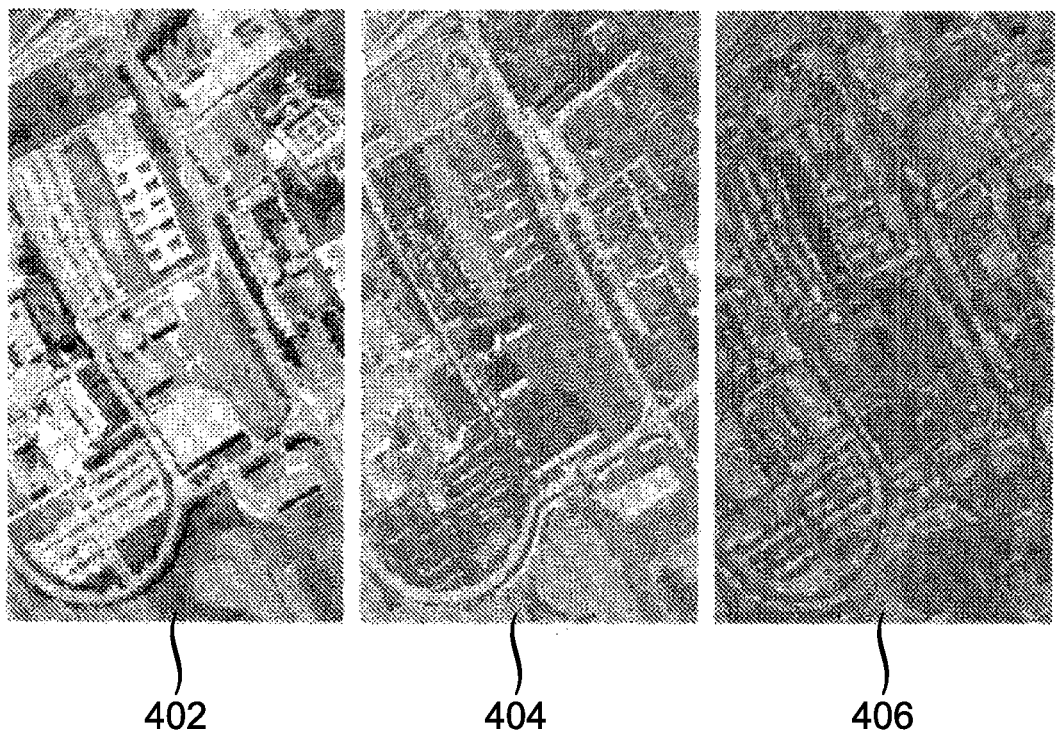
FIG. 4 illustrates example segmentation and classification results for a baseline implementation of RHSEG.
Figure 4:
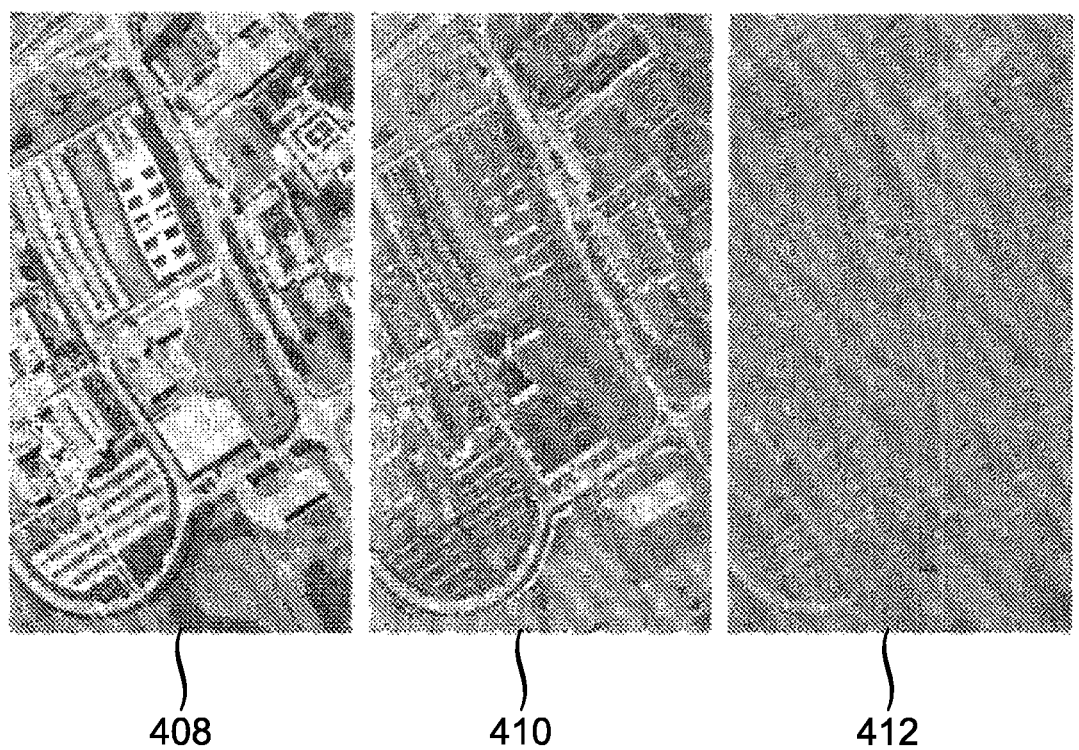

FIG. 4 illustrates example segmentation and classification results with default values for version 1.47 of RHSEG which is the 'unmodified' baseline. Image 402 illustrates a region mean image with spclust_wght=0.1. Image 404 illustrates a classification with spclust_wght=0.1. Image 406 illustrates a region class map with spclust_wght=0.1. Image 408 illustrates a region mean image with spclust_wght=1.0. Image 410 illustrates a classification with spclust_wght=1.0. Image 412 illustrates a region class map with spclust_wght=1.0.

Figure 5:
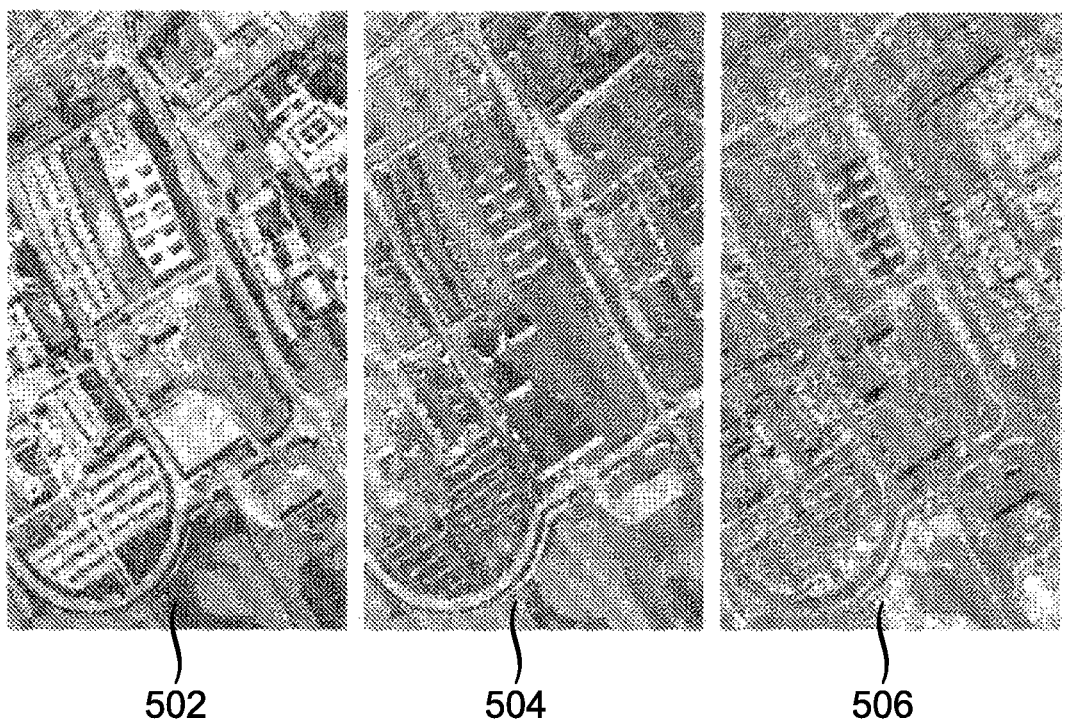
FIG. 5 illustrates additional example segmentation and classification results for an improved implementation of RHSEG.
Figure 6:
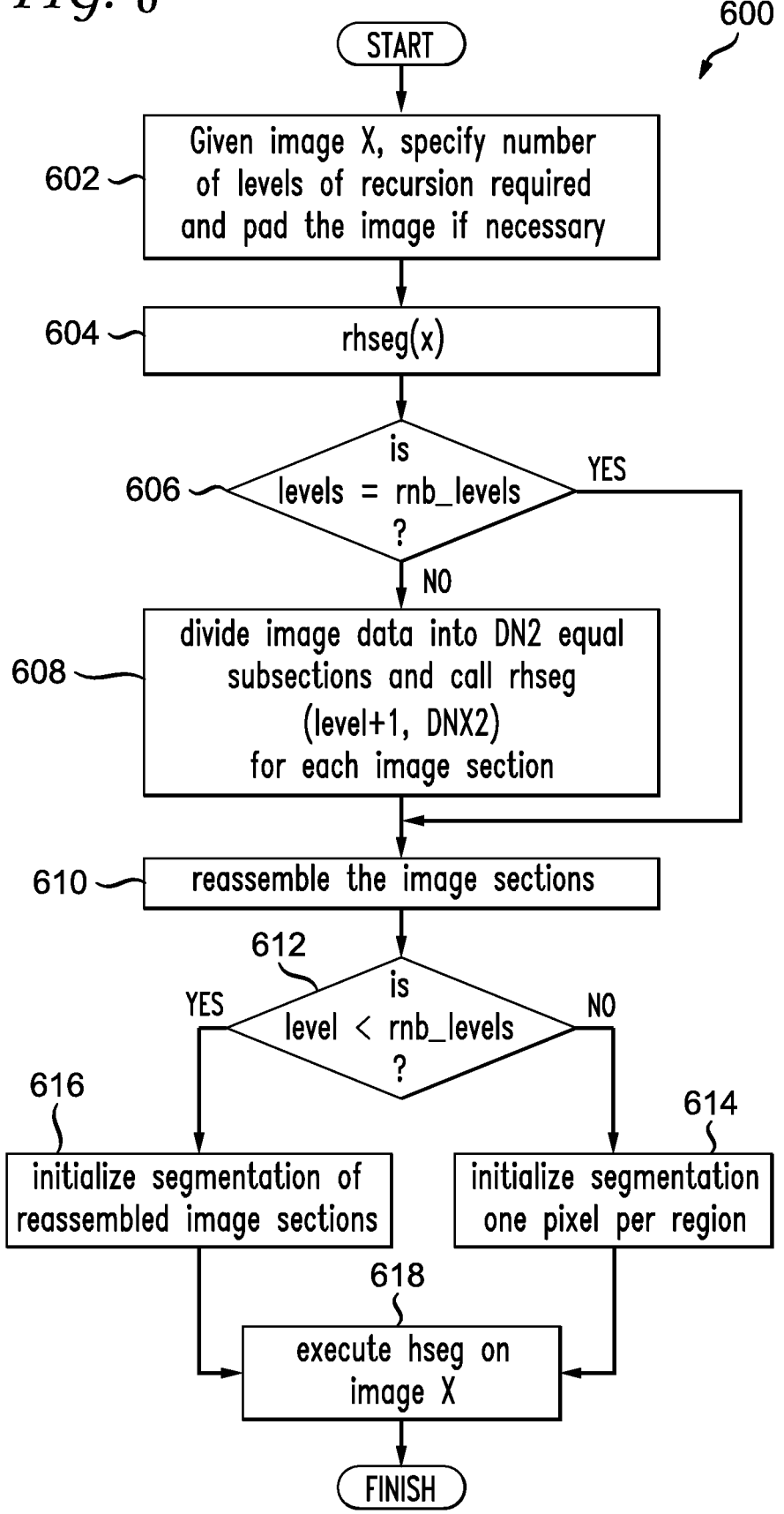
FIG. 6 illustrates an example logic flow.

FIG. 5 illustrates example segmentation and classification results for an improved implementation RHSEG, version 1.51, which includes all of the improvements disclosed herein. Image 502 illustrates a region mean image with spclust_wght=1.0. Image 504 illustrates a classification with spclust_wght=1.0. Image 506 illustrates a region class map with spclust_wght=1.0. The differences in these images show how the two implementations of the HSEG algorithm and different values for spclust_wght can impact image classification.

The refinements of the HSEG algorithm disclosed herein provide a more direct method of improving the computational processing efficiency of HSEG without the recursive subdivision of the image for initial processing of RHSEG, and subsequent need to eliminate processing window artifacts as the subsections of the image data are recombined in RHSEG.

Having disclosed the image processing concepts, algorithms, and some basic system components, the disclosure now turns to the exemplary method embodiment for processing image information as shown in FIG. 7. For the sake of clarity, the method is discussed in terms of an exemplary system 100 as shown in FIG. 1 configured to practice the method. The steps outlined herein are exemplary and can be implemented in any combination thereof, including combinations that exclude, add, or modify certain steps. This method can be incorporated as part of an image processing architecture that processing images at an object level and not just on a per-pixel basis.

The system 100 receives image data (702). The image can be generated by satellite, space-based imaging sensors, and/or other cameras. The image data can be a composite of image data from multiple inputs of the same or different types. The system can either evaluate the pixels to generate this information or can receive this information in a pre-processed or ready-to-go format. The system 100, in a first operating mode (704) that yields first merged regions, identifies spatially adjacent regions in the image data (704a) and merges spatially adjacent regions having a spectral similarity above a minimum spectral similarity threshold (704b). The regions typically represent objects or classes of objects, as set forth above. Then the system 100, in a second operating mode (706) computes a spectral similarity value for all regions, including spatially non-adjacent regions and spatially adjacent regions, in the image data having at least a minimum number of pixels (706a), weights the minimum spectral similarity threshold to yield a weighted minimum spectral similarity threshold (706b), and merges two or more spatially non-adjacent regions by comparing respective spectral similarity values to the weighted minimum spectral similarity threshold (706c). The minimum spectral similarity threshold can be weighted by a factor greater than 0 and less than 1. The regions can represent a single object or multiple different objects having a common set of similar characteristics. The system can merge regions based on spectral and/or spatial information in the pixel-level imagery data. Finally the system 100 can output a combination of the first merged regions and the second merged regions (708). The system 100 can alternate between the first operating mode and the second operating mode in an intertwining fashion.

The system 100 can perform some optional steps as well. For example, the system 100 can also dynamically determine the minimum number of pixels based on a targeted range of a number of regions. Alternatively, the system 100 can determine the minimum number of pixels based on a desired level of improved image segmentation accuracy and/or a desired level of computational speed. A larger minimum number of pixels results in faster computation, but potentially lower segmentation accuracy, while a smaller minimum number of pixels results in the opposite.

The system can adjust the minimum number of pixels automatically when the number of large regions falls below the target range of number of regions by following a set of steps. First, the system can decrement the minimum number of pixels, and the number of large regions is determined base on the new minimum number of pixels. If then this newly determined number of regions is a factor (>1, defaulted to 6) above the maximum number of regions, the system increments the minimum number of pixels and performs the non-adjacent regions based on the decremented minimum number of pixels. In any case, if the number of large regions is determined to be less than two, the system increases the minimum number of pixels by one and performs the non-adjacent merging process using this minimum number of pixels to determine the large region considered for merging. The system can trigger these steps whenever the minimum number of pixels per region changes, upon a user request, or at any other appropriate time.

The default and other values disclosed herein are exemplary and can be adjusted in any direction based on a particular application or a particular set of desired outputs. For example, while one default value for spclust_max is 1024, any other suitable value can be substituted, such as 512 or 32761.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein are applicable to graph-based knowledge discovery, data mining, archeological efforts based on space-based images, measuring urbanization levels, and estimating forest characteristics from sparse LIDAR data, for example. Those skilled in the art will readily recognize various modifications and changes that may be made to the principles described herein without following the example embodiments and applications illustrated and described herein, and without departing from the spirit and scope of the disclosure.

I claim:

1. A system comprising:
a processor;
a memory storing instructions for controlling the processor to perform steps comprising:
receiving image data;
in a first operating mode yielding first merged regions:
identifying spatially adjacent regions in the image data;
merging spatially adjacent regions having a spectral similarity above a minimum spectral similarity threshold;
in a second operating mode yielding second merged regions:
computing a spectral similarity value for all regions, including spatially non-adjacent regions and spatially adjacent regions, in the image data having at least a minimum number of pixels;
weighting the minimum spectral similarity threshold to yield a weighted minimum spectral similarity threshold;
merging spatially non-adjacent regions by comparing respective spectral similarity values to the weighted minimum spectral similarity threshold; and
outputting a combination of the first merged regions and the second merged regions.

2. The system of claim 1, wherein the minimum spectral similarity threshold is weighted by a factor greater than 0 and less than or equal to 1.

3. The system of claim 1, wherein merging spatially non-adjacent regions further comprises merging a pair of spatially non-adjacent regions.

4. The system of claim 1, wherein the minimum number of pixels is dynamically determined based on a targeted range of a number of regions.

5. The system of claim 1, wherein the minimum number of pixels is dynamically determined based on a desired level of improved image segmentation accuracy.

6. The system of claim 1, wherein the minimum number of pixels is dynamically determined based on a desired level of computational speed.

7. The system of claim 1, further comprising alternating between the first operating mode and the second operating mode.

8. A non-transitory computer-readable storage medium storing instructions which, when executed by a computing device, cause the computing device to perform steps comprising:
receiving image data;
in a first operating mode yielding first merged regions:
identifying spatially adjacent regions in the image data;
merging spatially adjacent regions having a spectral similarity above a minimum spectral similarity threshold;
in a second operating mode yielding second merged regions:
computing a spectral similarity value for all regions, including spatially non-adjacent regions and spatially adjacent regions, in the image data having at least a minimum number of pixels;
weighting the minimum spectral similarity threshold to yield a weighted minimum spectral similarity threshold;
merging spatially non-adjacent regions by comparing respective spectral similarity values to the weighted minimum spectral similarity threshold; and
outputting a combination of the first merged regions and the second merged regions.

9. The non-transitory computer-readable storage medium of claim 8, wherein the minimum spectral similarity threshold is weighted by a factor greater than 0 and less than or equal to 1.

10. The non-transitory computer-readable storage medium of claim 8, wherein merging spatially non-adjacent regions further comprises merging a pair of spatially non-adjacent regions.

11. The non-transitory computer-readable storage medium of claim 8, wherein the minimum number of pixels is dynamically determined based on a targeted range of a number of regions.

12. The non-transitory computer-readable storage medium of claim 8, wherein the minimum number of pixels is dynamically determined based on a desired level of improved image segmentation accuracy.

13. The non-transitory computer-readable storage medium of claim 8, wherein the minimum number of pixels is dynamically determined based on a desired level of computational speed.

* * * * *